(12) United States Patent  
Wang et al.

(10) Patent No.: US 12,469,151 B2
(45) Date of Patent: Nov. 11, 2025

(54) OBJECT TRAIL ANALYTICS

(71) Applicant: INTERNATIONAL BUSINESS MACHINES CORPORATION, Armonk, NY (US)

(72) Inventors: Jun Wang, Xi'an (CN); Jing Xu, Xi'an (CN); Wen Pei Yu, Xian (CN); Lei Gao, Xian (CN); Jin Wang, Xi'an (CN); A Peng Zhang, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 936 days.

(21) Appl. No.: 17/651,818

(22) Filed: Feb. 21, 2022

(65) Prior Publication Data

US 2023/0267622 A1 Aug. 24, 2023

(51) Int. Cl.
*G06T 7/246* (2017.01)

(52) U.S. Cl.
CPC .... *G06T 7/246* (2017.01); *G06T 2207/10016* (2013.01); *G06T 2207/30236* (2013.01)

(58) Field of Classification Search
CPC ........... G06T 7/246; G06T 2207/10016; G06T 2207/30236
See application file for complete search history.

(56) References Cited

U.S. PATENT DOCUMENTS

| 10,270,642 | B2 * | 4/2019 | Zhang | G01S 13/00 |
| 11,016,491 | B1 * | 5/2021 | Millard | G06N 3/045 |
| 11,064,107 | B2 | 7/2021 | Gefen | |
| 11,885,637 | B2 * | 1/2024 | Stenneth | G01C 21/3822 |
| 12,030,507 | B2 * | 7/2024 | Grossman | B60W 60/0027 |
| 12,065,140 | B1 * | 8/2024 | Pronovost | B60W 40/04 |

(Continued)

FOREIGN PATENT DOCUMENTS

CN 101271518 A 9/2008

OTHER PUBLICATIONS

Deng et al., "Road Short-Term Travel Time Prediction Method Based on Flow Spatial Distribution and the Relations", https://www.hindawi.com/journals/mpe/2016/7626875/, Hindawi Publishing Corporation, Mathematical Problems in Engineering, vol. 2016, Article ID 7626875, 2016, http://dx.doi.org/10.1155/2016/7626875, pp. 1-15.

(Continued)

*Primary Examiner* — Peter D Nolan
*Assistant Examiner* — Mikko Okechukwu Obioha
(74) *Attorney, Agent, or Firm* — Amin, Turocy & Watson, LLP

(57) ABSTRACT

A method, a structure, and a computer system for object trail analytics. The exemplary embodiments may include obtaining time series data detailing an average speed of one or more roads within a traffic network at one or more times. The exemplary embodiments may further include extracting one or more features corresponding to the time series data, and generating one or more time series forecasting models based on the time series data and the one or more features. Additionally, the exemplary embodiments may include identifying a current location of a moving object within the traffic network, and predicting a speed of the moving object based on applying the one or more time series forecasting models to the current location.

20 Claims, 6 Drawing Sheets

(56) References Cited

U.S. PATENT DOCUMENTS

| | | | |
|---|---|---|---|
| 12,202,469 B2* | 1/2025 | Lee | G05D 1/0278 |
| 2018/0342067 A1 | 11/2018 | Saito | |
| 2019/0187720 A1* | 6/2019 | Fowe | G01C 21/3676 |
| 2019/0369616 A1* | 12/2019 | Ostafew | G08G 1/0112 |
| 2020/0249685 A1* | 8/2020 | Elluswamy | G05D 1/0221 |
| 2021/0237769 A1* | 8/2021 | Ostafew | G08G 1/042 |
| 2022/0284623 A1* | 9/2022 | Kumar | G01S 17/89 |
| 2024/0304089 A1* | 9/2024 | Glas | G08G 1/096783 |

OTHER PUBLICATIONS

Georgiou, et al., "Moving Objects Analytics: Survey on Future Location & Trajectory Prediction Methods", ReachGate, https://www.researchgate.net/publication/326366934_Moving_Objects_Analytics_Survey_on_Future_Location_Trajectory_Prediction_Methods, Jul. 2018, pp. 1-46.

Katrenko, Deep learning for overcoming challenges of detecting moving objects in video', Apriorit, Dev Blog, https://www.apriorit.com/dev-blog/607-deep-learning-moving-object-detection-video, Apr. 4, 2019, pp. 1-25.

Mell et al., "The NIST Definition of Cloud Computing", National Institute of Standards and Technology, Special Publication 800-145, Sep. 2011, pp. 1-7.

Sundararaman et al., "Customizable Vehicle Tracking with Intelligent Prediction System", https://link.springer.com/chapter/10.1007/978-3-319-68557-1_27, © IFIP International Federation for Information Processing 2017 Published by Springer International Publishing AG 2017, DOI: 10.1007/978-3-319-68557-1_27, pp. 298-310.

Xu et al., "Time-Series Prediction with Applications to Traffic and Moving Objects Databases?", https://www.researchgate.net/publication/314819214_Time-series_prediction_with_applications_to_traffic_and_moving_objects_databases, The 3rd ACM international workshop, MobiDE'03, Sep. 19, 2003, San Diego, California, USA. pp. 1-5.

* cited by examiner

OBJECT TRAIL ANALYTICS

BACKGROUND

The exemplary embodiments relate generally to video analytics, and more particularly to object trail analytics.

Cameras are ubiquitous in modern urban and suburban areas. Cameras are, for example, regularly incorporated into personal electronics, implemented within home security systems, and utilized by municipalities around public roads and buildings to facilitate the critical roles of maintenance, traffic monitoring, security, and the like. Cameras may also provide a means for tracking moving objects, such as vehicles, items, or persons, via object trails. Analyzing object trails, however, relies heavily on manual video analysis that includes combing through hundreds of hours of video in an inefficient and uneconomical manner.

SUMMARY

The exemplary embodiments disclose a method, a structure, and a computer system for object trail analytics. The exemplary embodiments may include obtaining time series data detailing an average speed of one or more roads within a traffic network at one or more times. The exemplary embodiments may further include extracting one or more features corresponding to the time series data, and generating one or more time series forecasting models based on the time series data and the one or more features. Additionally, the exemplary embodiments may include identifying a current location of a moving object within the traffic network, and predicting a speed of the moving object based on applying the one or more time series forecasting models to the current location.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
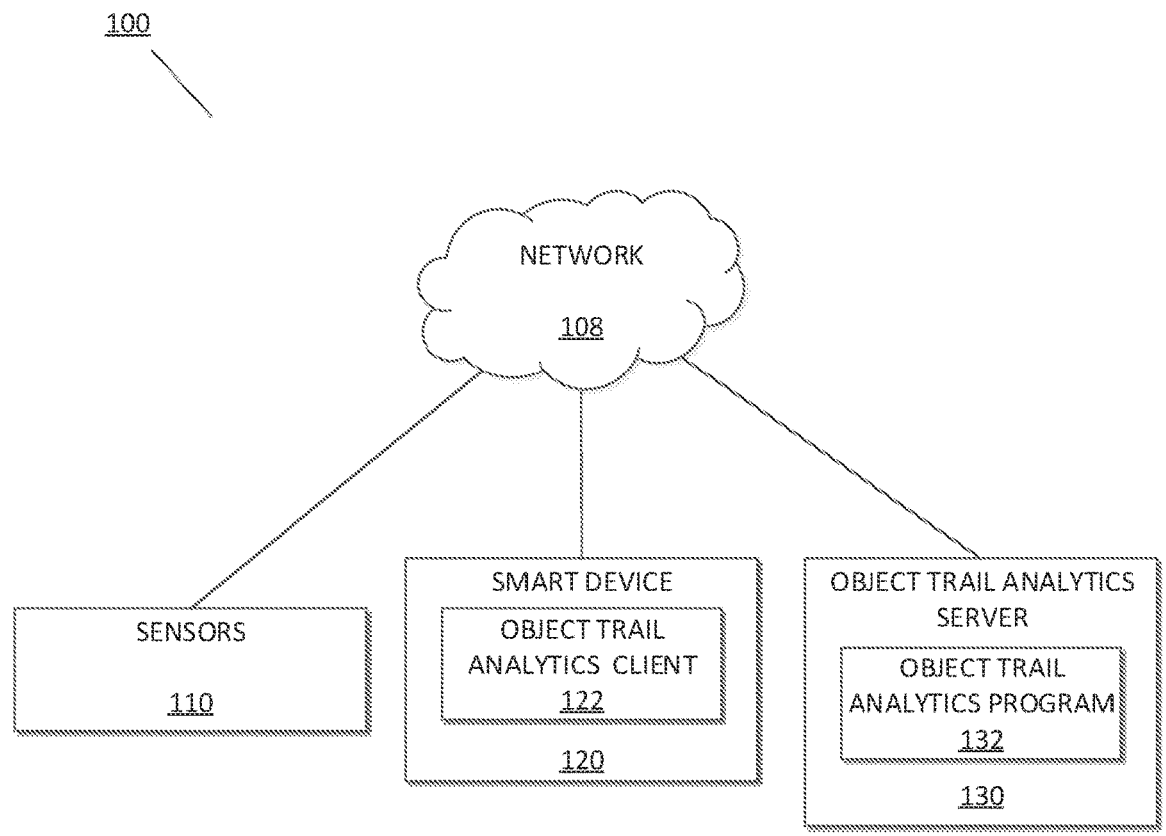
FIG. 1 depicts an exemplary schematic diagram of an object trail analytics system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Cameras are ubiquitous in modern urban and suburban areas. Cameras are, for example, regularly incorporated into personal electronics, implemented within home security systems, and utilized by municipalities around public roads and buildings to facilitate the critical roles of maintenance, traffic monitoring, security, and the like. Cameras may also provide a means for tracking moving objects, such as vehicles, items, or persons, via object trails. Analyzing object trails, however, relies heavily on manual video analysis that includes combing through hundreds of hours of video in an inefficient and uneconomical manner.

The present invention discloses a means to automatically and efficiently perform object trail analysis of video depicting a traffic network, allowing the prediction of a next location and timing thereof of a moving object. The present invention performs object trail analysis by first creating time series data for all roads within the traffic network, from which features for all possible road traffic impact factors are extracted. The present invention may then train time series forecasting models that, when applied to real-time features, estimates a time of arrival (ETA) at a next point of interest of the moving object. The present invention additionally leverages adjacency relations among roads to narrow results, as well as applies a proper routing check strategy. Overall, by estimating an ETA of the moving object at a next point of interest, the present invention reduces the time needed performing object trail analysis of a video or image.

FIG. 1 depicts the object trail analytics system 100, in accordance with exemplary embodiments. According to the exemplary embodiments, the object trail analytics system 100 may include one or more sensors 110, a smart device 120, and an object trail analytics server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. The operations of the object trail analytics system 100 are described in greater detail herein.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), a combination thereof, etc. In further embodiments, the network 108 may be a Bluetooth network, a Wi-Fi network, a combination thereof, etc. The network 108 may operate in frequencies including 2.4 gHz and 5 gHz internet, near-field communication, etc. In yet further embodiments, the network 108 may be a telecommunications network used to facilitate telephone calls between two or more parties comprising a landline network, a wireless network, a closed network, a satellite network, a combination thereof, etc. In general, the network 108 may represent any combination of connections and protocols that will support communications between connected devices.

In exemplary embodiments, the sensors 110 may be one or more devices capable of collecting data. More particularly, the sensors 110 may be capable of sensing information with respect to location, speed, weather, events, etc., and may accordingly be a GPS module, camera, traffic sensor, weather station (e.g., sensors for collecting temperature, humidity, precipitation, wind, pressure, etc), online resources detailing events such as concerts, sporting events, street cleaning, parades, etc. The sensors 110 are described in greater detail with respect to FIG. 2.

Figure 6:
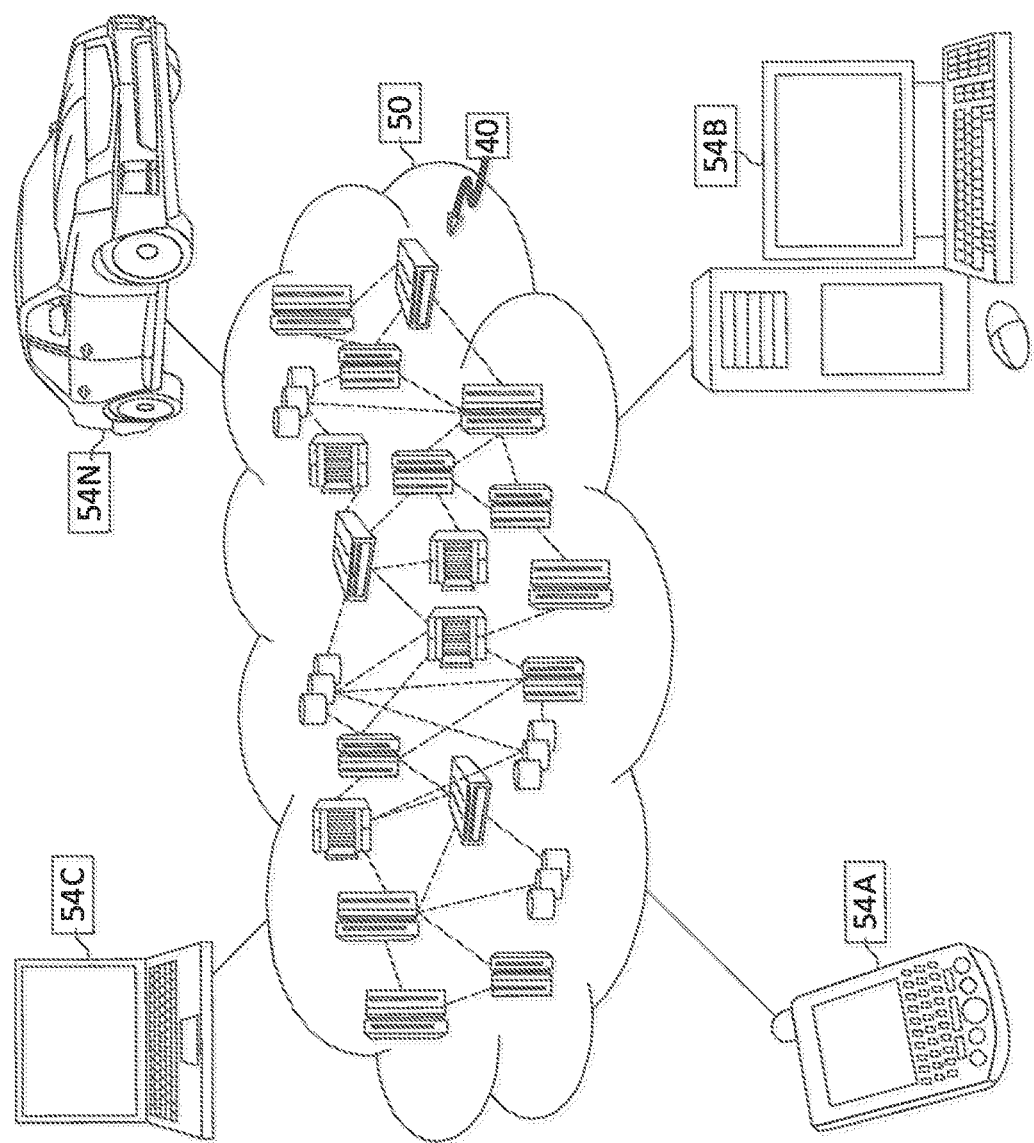
FIG. 6 depicts a cloud computing environment, in accordance with the exemplary embodiments.
Figure 7:
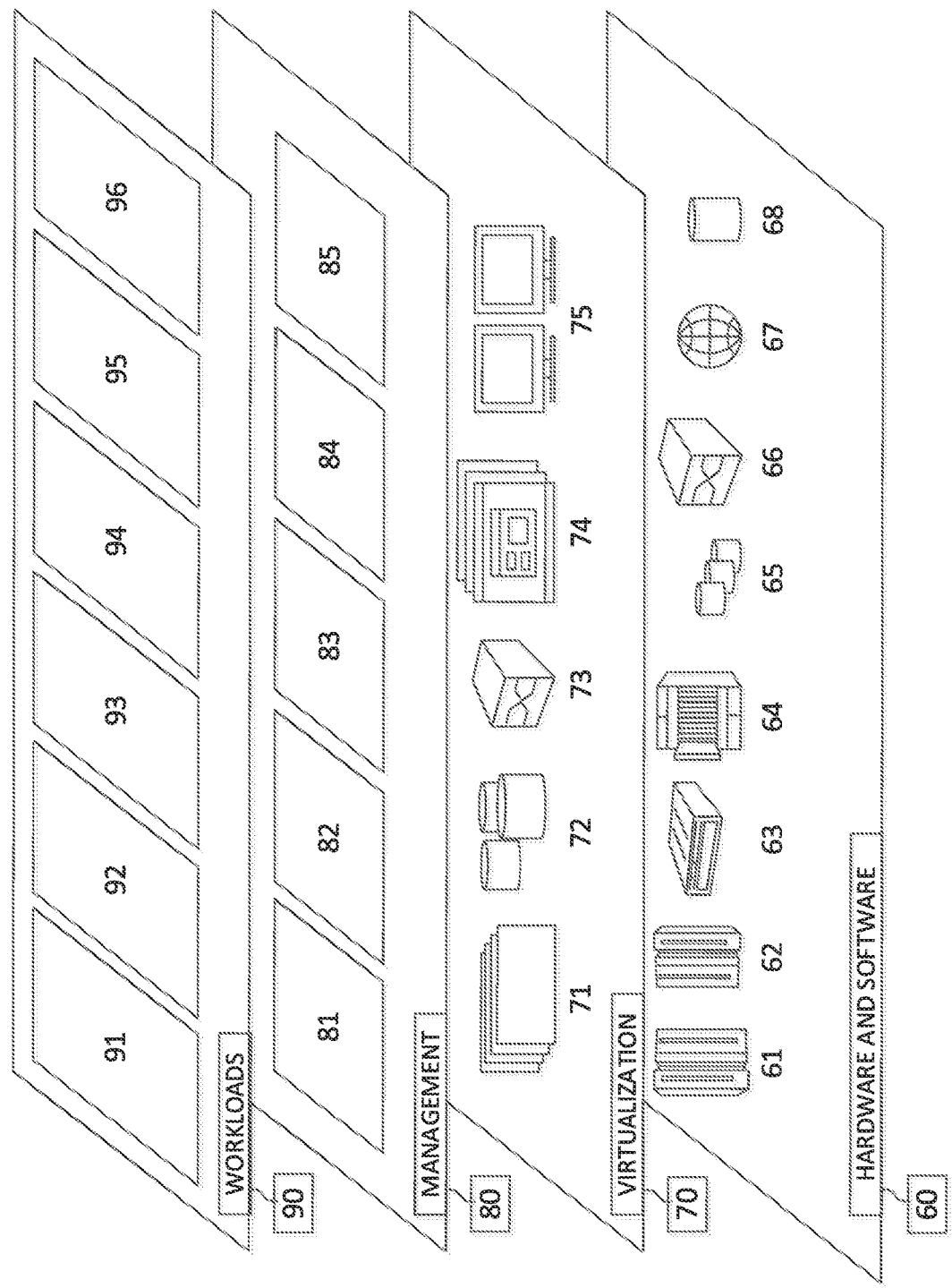
FIG. 7 depicts abstraction model layers, in accordance with the exemplary embodiments.

In exemplary embodiments, the smart device 120 includes an object trail analytics client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 5, as part of a cloud implementation with reference to FIG. 6, and/or as utilizing functional abstraction layers for processing with reference to FIG. 7.

The object trail analytics client 122 may act as a client in a client-server relationship, e.g., with the object trail analytics server 130, and may be a software and/or hardware application capable of communicating with and providing a user interface for a user to interact with the object trail analytics server 130 and other computing devices via the network 108. Moreover, the object trail analytics client 122 may be further capable of transferring data from the smart device 120 to and from other devices via the network 108. In embodiments, the object trail analytics client 122 may utilize various wired and wireless connection protocols for data transmission and exchange, including Bluetooth, 2.4 gHz and 5 gHz internet, near-field communication (NFC), etc. The object trail analytics client 122 is described in greater detail with respect to FIG. 2-7.

In exemplary embodiments, the object trail analytics server 130 includes an object trail analytics program 132, and may act as a server in a client-server relationship with the object trail analytics client 122. The object trail analytics server 130 may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the object trail analytics server 130 is shown as a single device, in other embodiments, the object trail analytics server 130 may be comprised of a cluster or plurality of computing devices, in a modular manner, etc., working together or working independently. The object trail analytics server 130 is described in greater detail as a hardware implementation with reference to FIG. 5, as part of a cloud implementation with reference to FIG. 6, and/or as utilizing functional abstraction layers for processing with reference to FIG. 7.

The object trail analytics program 132 may be a software and/or hardware program that may create time series data of all roads and create one or more features based on road traffic impact factors. The object trail analytics program 132 may further build time series forecasting models based on the time series data and the created features. The object trail analytics program 132 may then identify the current location of a moving object and forecast an ETA at a next point of interest of the moving object based on applying the time series forecasting models. The object trail analytics program 132 is described in greater detail with reference to FIG. 2-7.

Figure 2:
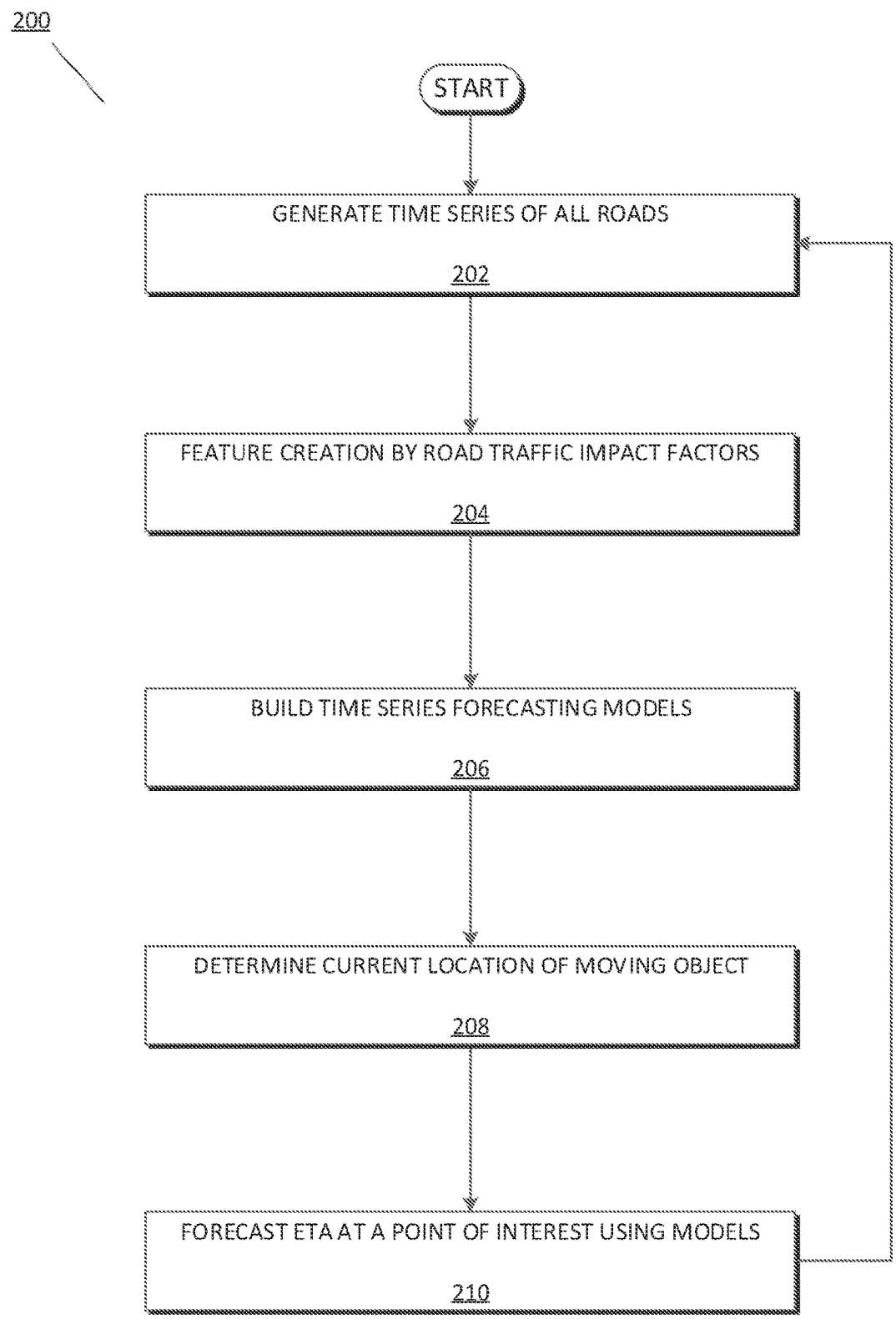
FIG. 2 depicts an exemplary flowchart 200 illustrating an object trail analytics program 132 of the object trail analytics system 100, in accordance with the exemplary embodiments.

FIG. 2 depicts an exemplary flowchart 200 illustrating the operations of the object trail analytics program 132 of the object trail analytics system 100, in accordance with the exemplary embodiments.

The object trail analytics program 132 may create time series of all roads (step 202). In embodiments, the object trail analytics program 132 may build time series data of all roads within an area in which the object trail analytics system 100 is deployed, e.g., a city. The time series data may detail an average rate of speed of vehicles travelling on each of the roads per unit of time, e.g., miles per hour (MPH) or kilometres per hour (KPH), per time interval (hereinafter p, e.g., one, five minute intervals). The average rate of speed may apply to a road in entirety or to segments of the roads, which may be segmented by length, stop signs/lights, intersections, geography, municipality border, etc.

In embodiments, the time series data detailing average rate of speed may be collected via reference to a database or the sensors 110. The database may map all of the roads within an area, including relative positions of the roads, road lengths, speed limits, etc. The map may detail one or more roads that a given road is directly connected to (first order) as well as one or more roads that the given road is indirectly connected to (second, third, etc., order). First order roads are directly connected to the given road, second order roads are connected to the given road by a first order road, third order roads are connected to the given road by a first and second order road, and so forth. Each road within the network may have any number of connected roads of any order. In embodiments, the database and/or map may further detail average rates of speeds of the roads. Alternatively or additionally, the object trail analytics program 132 may determine average rate of speed of the roads via the sensors 110.

The sensors 110 may comprise, e.g., a GPS module capable of indicating location at different timestamps, from which speed along roads may be calculated based on, e.g., distance over time. In such embodiments, the GPS modules may be included, e.g., on a bus, taxi, smart device within a vehicle, etc., as it traverses the road or segments thereof. The object trail analytics program 132 may determine when a moving object enters and exits a road, or segment thereof, by cross referencing GPS data of the moving object with the map of the roads. The object trail analytics program 132 may then compute an average rate of speed of that road or segment thereof based on distance covered by the moving object over duration of time between the timestamps.

In determining the average rate of speed of the roads within the traffic network, the sensors 110 may additionally act as alternative measurement devices, such as an accelerometer. The accelerometers may be included on or within the moving object, and may obtain data relating to acceleration and deceleration of the moving object in each of the x, y, and z axis. In embodiments, the object trail analytics program 132 may be capable of, e.g., determining the average rate of speed of the moving object based on a duration and magnitude of recorded acceleration. In addition, the object trail analytics program 132 may be capable of analysing the accelerometer data in order to identify a start, any turns, and an end of object movement. In particular, the object trail analytics program 132 may utilize increases and decreases in acceleration, as well as timestamps thereof, as indicators of departing/approaching a stop light/sign at the beginning/end of roads, reaching maximum speed, etc. The object trail analytics program 132 may additionally correlate the acceleration data in the one or more axis with the bends and curves of a road in order to distinguish between starting, stopping, and turning. The object trail analytics program 132 may distinguish between data indicating the start and stop of a road from, e.g., traffic within the road, based on comparing a known or estimated location of the object to the beginning and end locations of the road, where the further away from the start and end location of the road, the more likely the moving object is in traffic. Based on a length distance of the road and the timestamps at which accelerometer data indicates the moving object has entered and exited the road, whilst also accounting for the turning and false positives discussed above, the object trail analytics program 132 may be capable of deducing an average rate of speed the road.

In other embodiments, the object trail analytics program 132 may compute the average rate of speed of each road alternatively. The object trail analytics program 132 may be capable of, e.g., determining the average rate of speed of the moving object based on video/imagery. The object trail analytics program 132 may, e.g., identify an object at a first location at a first time based on a first video feed then subsequently identify the moving object at a second location at a second time based on a second feed, allowing the object trail analytics program 132 to calculate a speed of the moving object based on distance and timing between the two positions and timestamps.

The object trail analytics program 132 may identify a position of the moving object within the video based on estimating a distance between the moving object and a camera, e.g. using spatial video analysis, ranging techniques such as radar or LiDAR, trilateration or trilateration with multiple of the sensors 110, etc. The object trail analytics program 132 may then compare the estimated distance to and direction of the object to a known location and orientation of the camera in order to deduce a location.

The object trail analytics program 132 may build time series data of travel speeds for each of the roads within the area at consecutive time intervals, e.g., average speed per minute or per five minutes, thereby creating a database indicating an average road speed on any road within the network at any time interval of a day.

In order to better illustrate the operations of the object trail analytics program 132, reference is now made to an illustrative example wherein the object trail analytics program 132 is implemented within a city. The object trail analytics program 132 generates time series data for all roads within the city based on data collected by the sensors 110, and exemplary time series data of RoadID 1 over ten-second intervals on Jan. 1, 2020 is illustrated by Table 1:

TABLE 1

Average Speed Time Series

| RoadID | Time | Speed |
|---|---|---|
| 1 | 2020.1.1. 00:00:00 | 73.1 |
| 1 | 2020.1.1. 00:00:10 | 71.4 |
| 1 | 2020.1.1. 00:00:20 | 78.6 |
| 1 | 2020.1.1. 00:00:30 | 68.6 |
| 1 | 2020.1.1. 00:00:40 | 79.6 |
| 1 | 2020.1.1. 00:00:50 | 75.6 |
| 1 | 2020.1.1. 00:01:00 | 68.6 |
| 1 | 2020.1.1. 00:01:10 | 79.6 |
| 1 | 2020.1.1. 00:01:20 | 75.6 |
| 1 | 2020.1.1. 00:01:30 | 73.1 |
| 1 | 2020.1.1. 00:01:40 | 65.4 |
| 1 | 2020.1.1. 00:01:50 | 68.9 |
| ... | ... | ... |

The object trail analytics program 132 may create features based on road impact factors (step 204). In embodiments, the object trail analytics program 132 may create features for every road at every time point per day. The features may be indicative of conditions present when the time series data was collected, and include "DayType"="Work"/"Weekend"/ "Holiday", as well as "Season"="Spr"/"Sum"/"Fal"/"Win". The "DayType" and "Season" features may be indicative of how day of the week and season impact the average time series of a particular road.

The features may also include 5-day, 10-day, 20-day, etc., historic average speed values for five time points prior to the current time point, collectively known as the feature "Time". For example, and with reference to Tables 2 and 3 below, when considering the average speed on a street at a given time point of 12:06 PM, the object trail analytics program 132 may average the speeds of each of minute between 12:01-12:05 over the last 5, 10, 20, etc. days. Table 2 illustrates the average rate of speed on road 1 at 12:05 and 12:04 for the prior five days of 1.25.2020 to 1.29.2020. Note that although 12:03, 12:02, and 12:01 are omitted for brevity, the process may be continued throughout or beyond those minutes as desired (e.g., prior 5, 10, 20 days).

TABLE 2

Time Feature Time Series

| RoadID | Time | Speed | |
|---|---|---|---|
| 1 | 2020.1.29 12:05 | 67.4 | |
| 1 | 2020.1.28 12:05 | 73.4 | |
| 1 | 2020.1.27 12:05 | 68.2 | P1_5 Day_Avg_Speed |
| 1 | 2020.1.26 12:05 | 79.3 | |
| 1 | 2020.1.25 12:05 | 66.5 | |
| 1 | 2020.1.29 12:04 | 76.4 | |
| 1 | 2020.1.28 12:04 | 67.3 | |
| 1 | 2020.1.27 12:04 | 71.3 | P2_5 Day_Avg_Speed |
| 1 | 2020.1.26 12:04 | 65.7 | |
| 1 | 2020.1.25 12:04 | 68.9 | |

Table 3 illustrates the average rate of speed for each of the first prior minute P1 and the second prior minute P2 over the last five days. Again, noting that although P3, P4, and P5 are omitted for brevity, averaged rates of speeds may be computed for any number of previous minutes P the minute over the last five, 10, 20, etc., days.

TABLE 3

Time Feature

| RoadID | Time | Speed | P1_5 Day_Avg_Speed | P2_5 Day_Avg_Speed | ... |
|---|---|---|---|---|---|
| 1 | 2020.1.30 12:06 | 74.5 | 70.96 | 69.92 | |
| ... | ... | ... | | | |

The "Time" feature may be similarly calculated for five-10 time points prior to the given time point for directly adjacent roads of the given road in order to compute "Geo_Special" related features. In embodiments, the object trail analytics program 132 may compute the Geo_Special feature to assess an impact that adjacent roads' speeds have on a road, and the feature may be assessed in a secondary time frame of five-ten time points prior (as opposed to a primary timeframe of one-five time points prior) in order to capture a delayed impact of traversing roads. For example, the average speed of road A at time point T may be impacted by the road speeds of roads B, C, and D at time points T-6~T-10. The object trail analytics program 132 may then average these speeds similarly to above over the last 5-days, ten-days, etc. to compute the Geo_Special feature.

The object trail analytics program 132 may further create features for weather events on the current road per unit time, such as {"Precipitation", "Wind", "Temperature", "AirQuality", etc.}. The weather features may be extracted from, e.g., a weather station within a threshold proximity that records weather measurements over time, and the object trail analytics program 132 may associate the extracted weather conditions at each of the roads with the corresponding time series data.

The features may further include "Events" and indicate the presence of, e.g., {"Road_Repairs"=0/1, "Traffic_Accident"=0/1, "Big_Event"=0/1, etc.}. The object trail analysis program 132 may identify road repairs, traffic accidents, and big events using various resources. For example, road work may be identified via reference to a public works schedule, construction company itinerary, permit applications and approvals, etc. In addition, road work and traffic accidents may be identified via analysis of real-time video footage, e.g., traffic surveillance, as well as analysis of multimedia such as news resources and public broadcasts, etc. Moreover, the object trail analysis program 132 may identify big events by way of reference to schedules of event venues that may include stadiums, concert halls, and other venues for hosting large gatherings that are capable of impacting road traffic.

In embodiments, the object trail analytics program 132 may collect the impact factors of the traffic status described above as "Features"={"time", "Geo_Special", "Weather", "Event"}. The object trail analysis program 132 may collect or reference the data for the time at which the time series data is collected such that the time series data is reflective of the conditions at that time. Based on the time series data and featured conditions, the object trail analysis program 132 may be capable of determining an impact that the featured conditions have on the time series data, which may then be used to predict estimated times of arrival at a next point of interest based thereon.

Furthering the illustrative example introduced above, the object trail analytics program 132 may generate features of "DayType", "Season", "Time", "Geo_Special", "Weather", and "Big_Event" for each road within the city environment at each of the times at which the time series data was collected.

The object trail analytics program 132 may build time series forecasting models (step 206). In embodiments, the time series forecasting models correlate average road speed of a road with the features present at that time, and application of the models may predict a speed of a moving object on a given road at a given time. Moreover, based on the predicted speeds at future points in time and a distance to a next point of interest, such as an intersection, the object trail analytics program 132 may predict an ETA of the moving object at the next point of interest.

The object trail analytics program 132 may build time series forecasting models for every h=[1,5] time steps for a single day on every road, where h is the number of time steps (i.e., number of time points). For each of these models, the object trail analytics program 132 may select the latest q=[90,180] days of time series data having the associated features, from which to build (60*24)/(h*p) time series forecasting models, where h is time step described above and p is the time interval of the averaged road speed data. The object trail analytics program 132 may then monitor the models' performance daily by confirming or rebutting predictions, then rebuild the model if the performance falls below a threshold (described in greater detail below). The index of i=[1, (60*24)/(h*p)] model may be used to forecast the road "Speed" at the timestamp after (i−1)*(h*p) minutes comparing to 00:00 for h prediction horizon.

With reference again to the formerly introduced example, assuming h=5 and p=2, the object trail analytics program 132 may generate time series forecasting model for the future time steps h of [00:02, 00:04, 00:06, 00:08, and 00:10]. While only one model is discussed for brevity, the object trail analytics program 132 may generate as many models in any granularity as needed to cover the entirety of a day.

The object trail analytics program 132 may identify a current location of a moving object (step 208). With additional reference to FIG. 3, the object trail analytics program 132 may determine a current location of a moving object by first constructing a first order adjacency matrix for all roads $R_i$. In embodiments, the first order adjacency matrix identifies the roads that are directly connected to a given road at which the moving object was last identified. The first order adjacency matrix may be computed as:

$$R_i A = \{R_{i+1}, \ldots, R_{i+r}\} \quad \text{Eq. 1}$$

Where r=1, 2, 3 . . . are one or more roads that are directly adjacent to the road. The object trail analytics program 132 may then forecast a "Speed" on road $R_i$ at timestamp t using the time series forecasting models, denoted by $R_i S_t$, before calculating the time to reach point of interest road $R_{i\_1}$, $R_i t_k$, by Eq. 2:

$$\text{Distance}(l_0, R_{i\_1}) = \Sigma_{t=0}^{k} R_i S_t * t \quad \text{Eq. 2}$$

Where $t_0$ is the starting location, $R_{1\_0}$ is the starting road, and $l_0$ is the starting location. If $t_1 < R_i t_k$, then the moving object has not reached the first point of interest, i.e., crossing, $R_{i\_1}$ of FIG. 3-4. Restated, the object trail program 132 may determine whether the elapsed time is less than the forecasted time it takes to reach a next point of interest, e.g., an intersection. If the elapsed time is less than that projected to reach the first point of interest, the object trail analytics program 132 determines that moving object has not yet reached the point of interest. The task of locating the moving object is now limited to an area prior to the next point of interest, or preparatory action may be taking at the point of interest.

Conversely, if $t_1 \geq R_i t_k$, then the object trail analytics program 132 may perform videos/image analysis in parallel of all $R_{i+r\_0}$ within the time window $R_i t_k \pm [1,3]$ minutes in order to confirm a next location of the moving object. Here, because the object trail analytics program 132 determines that the object has likely passed the point of interest, the object trail analytics program 132 identifies and analyses one or more roads beyond the point of interest within a time frame in which the moving object would likely traverse those next roads. Once the location is confirmed, e.g., via video analysis, the parallel video/image analysis may be ceased at the unconfirmed roads and the process may be repeated as needed.

Figure 3:
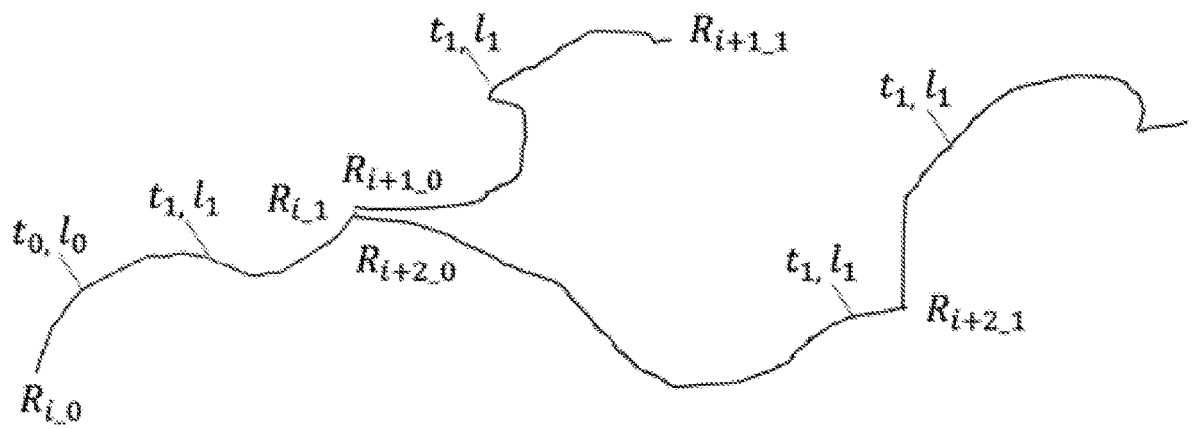
FIG. 3 depicts a map illustrating the operations of the object trail analytics program 132, in accordance with exemplary embodiments.

In the aforementioned example, and with continued reference to FIG. 3, the object trail analytics program 132 may determine whether an estimated time to reach first crossing $R_{i\_1}$ is greater than or less than elapsed time since last locating the moving object. If the elapsed time is greater than the time it takes to reach the next point of interest, here an intersection, the object trail analytics program 132 searches first order streets within several time points to confirm a new location of the moving object.

The object trail analytics program 132 may forecast an ETA at a next point of interest of the moving object (step 210). In exemplary embodiments, and with reference now to FIG. 4, the object trail analytics program 132 may forecast an ETA at a next intersection based on applying the time series forecasting model of the road $R_{i+r}$ that's nearest $t_1$ to forecast the ETA of the next crossing. The time series forecasting models may predict a speed of the moving object at any future point along the road such that, provided a distance to travel to a point of interest, the object trail analysis program 132 may compute an estimated time of arrival at the point of interest using distance and time.

The object trail analytics program 132 may fine tune the models based on the confirmed location such that future iterations will more accurately identify an ETA at a next point of interest. The object trail analytics program 132 may adjust $\text{Distance}(R_{j\_0}, R_{j\_1}) = \Sigma_{t=k}^{m} R_i S_t * t$ to $R_j$ that's been confirmed by visual surveillance $R_i$ to $R_j$. The object trail analytics program 132 may then obtain the whole current routing $R_i$ to $R_j$ to . . . ($t_1$, $l_1$).

Figure 4:
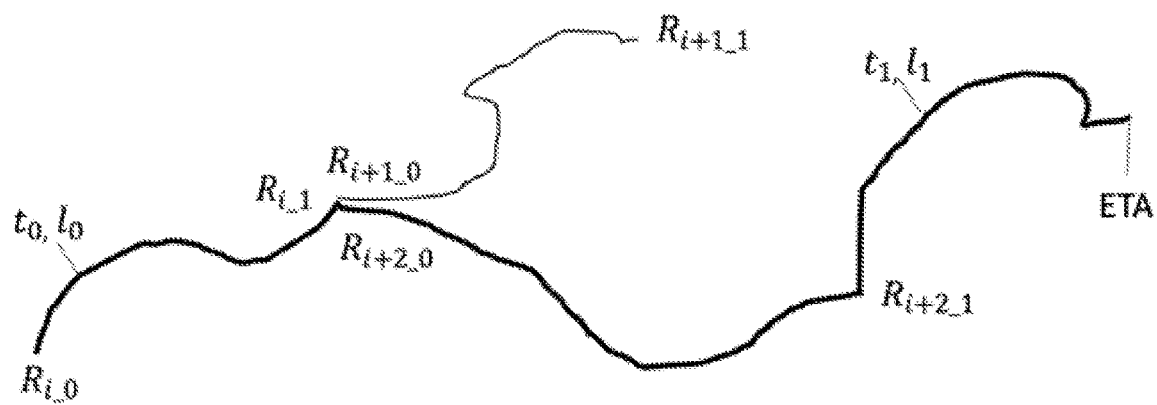
FIG. 4 depicts a map illustrating the operations of the object trail analytics program 132, in accordance with exemplary embodiments.

Concluding the aforementioned example, the object trail analytics program 132 estimates the time at which the moving object will cross the next point of interest at the ETA illustrated by FIG. 4.

FIG. 3 depicts a map illustrating the operations of the object trail analytics program 132, in accordance with exemplary embodiments.

FIG. 4 depicts a map illustrating the operations of the object trail analytics program 132, in accordance with exemplary embodiments.

Figure 5:
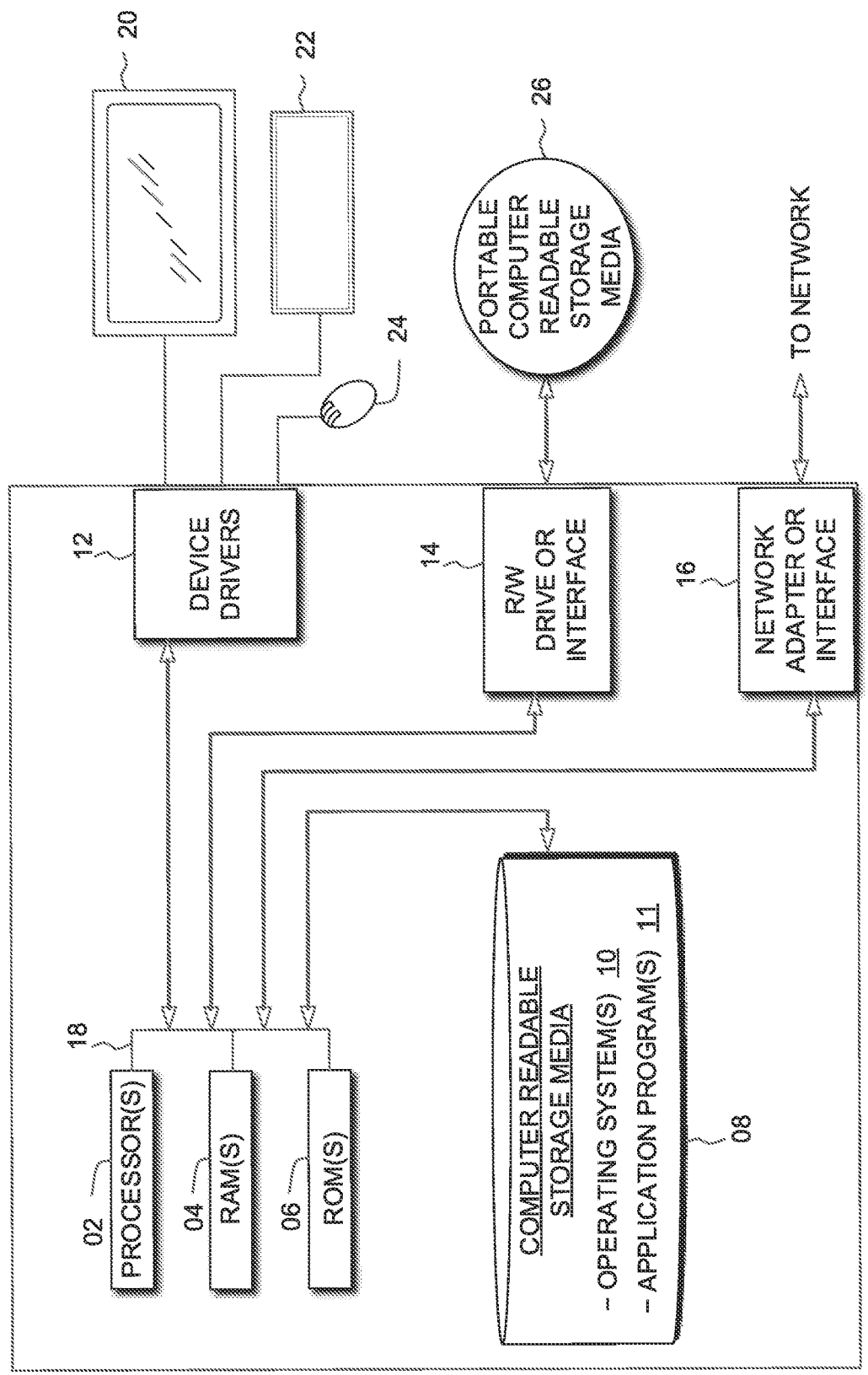
FIG. 5 depicts an exemplary block diagram depicting the hardware components of the object trail analytics system 100 of FIG. 1, in accordance with the exemplary embodiments.

FIG. 5 depicts a block diagram of devices used within object trail analytics system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object trail processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method, comprising:
   determining, by a system comprising a processor, time series data comprising respective average vehicle speeds on roads within a road network in respective time intervals of a group of time intervals, wherein the determining comprises monitoring, using distributed sensors of the road network, actual vehicle speeds of vehicles on the roads during the group of time intervals;
   for each of the roads:
      determining, using the distributed sensors of the road network, a respective group of features associated with the road at respective time points of a group of time points in a defined recurring time period corresponding to the time series data, and
      generating and training a defined quantity of time series forecasting models based on the respective average vehicle speed on the road in the respective time intervals and the respective group of features at the respective time points, wherein the defined quantity is a function of a quantity of time intervals in the group of time intervals and a quantity of time points in the group of time points, wherein the training comprises training the time series forecasting models to predict vehicle speeds of vehicles on the road, next points of interest in the road network for the vehicles, and estimated times of arrival of the vehicles at the predicted next points of interest;
   identifying, by the system, using the distributed sensors of the road network, a current location of a moving vehicle on a current road within the road network at a current time;
   selecting, by the system, at least one time series forecasting model selected from the time series forecasting models that is associated with a road of the current location and a respective time point within a defined time window of the current time; and
   predicting, by the system, using the at least one time series forecasting model and the current location, a vehicle speed of the moving vehicle on the current road.

2. The computer-implemented method of claim 1, further comprising:
   identifying, by the system, using the distributed sensors of the road network, current features of the current road and one or more adjacent roads of the road network that satisfy a criterion associated with adjacency;
   predicting, by the system, using the at least one time series forecasting model, a next point of interest in the road network for the moving vehicle based on the current road, the one or more adjacent roads, and the current features, wherein the predicting next point of interest comprises predicting vehicle speeds of the moving vehicle on the current road and the one or more adjacent roads at different future times based on the current features; and
   estimating, by the system, using the at least one time series forecasting model, a time of arrival of the moving vehicle at the predicted next point of interest within the road network based on the predicted vehicle speeds of the moving vehicle on the current road and the one or more adjacent roads at the different future times.

3. The computer-implemented method of claim 2, further comprising:
   determining, by the system, whether an elapsed time is greater than a difference between the current time and the estimated time of arrival; and
   based on determining that the elapsed time is greater than the difference between the current time and the estimated time of arrival, identifying, by the system, the moving vehicle in an adjacent road of the one or more adjacent roads within a specified timeframe.

4. The computer-implemented method of claim 3,
   based on determining that the elapsed time is not greater than the difference between the current time and the estimated time of arrival, determining, by the system, that the moving vehicle has not yet reached the predicted next point of interest.

5. The computer-implemented method of claim 1, wherein the time series forecasting models correlate the respective average vehicle speeds on the roads with the respective groups of features associated with the roads in the respective time intervals.

6. The computer-implemented method of claim 1, wherein the respective groups of features comprise at least one of day, season, time, weather, or events.

7. The computer-implemented method of claim 6, wherein the events comprise at least one of road work, traffic accidents, or shows.

8. A computer program product for object trail analytics, the computer program product comprising a non-transitory computer-readable media having program instructions embodied therewith, the program instructions executable by a processor to cause the processor to:
determine time series data comprising respective average vehicle speeds on roads within a road network in respective time intervals of a group of time intervals, wherein the determining comprises monitoring, using distributed sensors of the road network, actual vehicle speeds of vehicles on the roads during the group of time intervals;
for each of the roads:
determining, using the distributed sensors of the road network, a respective group of features associated with the road at respective time points of a group of time points in a defined recurring time period corresponding to the time series data, and
generate and train a defined quantity of time series forecasting models based on the respective average vehicle speed on the road in the respective time intervals and the respective group of features at the respective time points, wherein the defined quantity is a function of a quantity of time intervals in the group of time intervals and a quantity of time points in the group of time points, wherein the training comprises training the time series forecasting models to predict vehicle speeds of vehicles on the road, next points of interest in the road network for the vehicles, and estimated times of arrival of the vehicles at the predicted next points of interest;
identify a current location of a moving vehicle on a current road within the road network at a current time;
select at least one time series forecasting model selected from the time series forecasting models that is associated with a road of the current location and a respective time point within a defined time window of the current time; and
predict, using the at least one time series forecasting model and the current location, a vehicle speed of the moving vehicle on the current road.

9. The computer program product of claim 8, wherein the program instructions are further executable by the processor to cause the processor to:
identify, using the distributed sensors of the road network, current features of the current road and one or more adjacent roads of the road network that satisfy a criterion associated with adjacency;
predict, using the at least one time series forecasting model, a next point of interest in the road network for the moving vehicle based on the current road, the one or more adjacent roads, and the current features, wherein the predicting next point of interest comprises predicting vehicle speeds of the moving vehicle on the current road and the one or more adjacent roads at different future times based on the current features; and
estimate, using the at least one time series forecasting model, a time of arrival of the moving vehicle at the predicted next point of interest within the road network based on the predicted vehicle speeds of the moving vehicle on the current road and the one or more adjacent roads at the different future times.

10. The computer program product of claim 9, wherein the program instructions are further executable by the processor to cause the processor to:
determine whether an elapsed time is greater than a difference between the current time and the estimated time of arrival; and
based on determining that the elapsed time is greater than the difference between the current time and the estimated time of arrival, identify the moving vehicle in an adjacent road of the one or more adjacent roads within a specified timeframe.

11. The computer program product of claim 10, wherein the program instructions are further executable by the processor to cause the processor to:
based on determining that the elapsed time is not greater than the difference between the current time and the estimated time of arrival, determine that the moving vehicle has not yet reached the predicted next point of interest.

12. The computer program product of claim 8, wherein the time series forecasting models correlate the respective average vehicle speeds on the roads with the respective groups of features associated with the roads in the respective time intervals.

13. The computer program product of claim 8, wherein the respective groups of features comprise at least one of day, season, time, weather, or events.

14. The computer program product of claim 13, wherein the events comprise at least one of road work, traffic accidents, or shows.

15. A system, comprising:
a memory configured to store computer executable instructions; and
a processor configured to execute at least one of the computer executable instructions that:
determines time series data comprising respective average vehicle speeds on roads within a road network in respective time intervals of a group of time intervals, wherein the determining comprises monitoring, using distributed sensors of the road network, actual vehicle speeds of vehicles on the roads during the group of time intervals;
for each of the roads:
determines, using the distributed sensors of the road network, a respective group of features associated with the road at respective time points of a group of time points in a defined recurring time period corresponding to the time series data, and
generates and trains a defined quantity of time series forecasting models based on the respective average vehicle speed on the road in the respective time intervals and the respective group of features at the respective time points, wherein the defined quantity is a function of a quantity of time intervals in the group of time intervals and a quantity of time points in the group of time points, wherein the training comprises training the time series forecasting models to predict vehicle speeds of vehicles on the road, next points of interest in the road network for the vehicles, and estimated times of arrival of the vehicles at the predicted next points of interest;

identifies a current location of a moving vehicle on a current road within the road network at a current time;

selects at least one time series forecasting model selected from the time series forecasting models that is associated with a road of the current location and a respective time point within a defined time window of the current time; and predicts, using the at least one time series forecasting model and the current location, a vehicle speed of the moving vehicle on the current road.

16. The system of claim 15, wherein the at least one of the computer executable instructions further:

identifies, using the distributed sensors of the road network, current features of the current road and one or more adjacent roads of the road network that satisfy a criterion associated with adjacency;

predicts, using the at least one time series forecasting model, a next point of interest in the road network for the moving vehicle based on the current road, the one or more adjacent roads, and the current features, wherein the predicting next point of interest comprises predicting vehicle speeds of the moving vehicle on the current road and the one or more adjacent roads at different future times based on the current features; and estimates, using the at least one time series forecasting model, a time of arrival of the moving vehicle at the predicted next point of interest within the road network based on the predicted vehicle speeds of the moving vehicle on the current road and the one or more adjacent roads at the different future times.

17. The system of claim 16, wherein the at least one of the computer executable instructions further:

determines whether an elapsed time is greater than a difference between the current time and the estimated time of arrival; and based on determining that the elapsed time is greater than the difference between the current time and the estimated time of arrival, identifies the moving vehicle in an adjacent road of the one or more adjacent roads within a specified timeframe.

18. The system of claim 17, wherein the at least one of the computer executable instructions further:

based on determining that the elapsed time is not greater than the difference between the current time and the estimated time of arrival, determines that the moving vehicle has not yet reached the predicted next point of interest.

19. The system of claim 15, wherein the time series forecasting models correlate the respective average vehicle speeds on the roads with the respective groups of features associated with the roads in the respective time intervals.

20. The system of claim 15, wherein the respective groups of features comprise at least one of day, season, time, weather, or events.

* * * * *